United States Patent [19]

Polka

[11] Patent Number: 5,042,881
[45] Date of Patent: Aug. 27, 1991

[54] UNIVERSAL WHEEL LINER

[76] Inventor: John G. Polka, 1355 Margate, Libertyville, Ill. 60048

[21] Appl. No.: 578,205

[22] Filed: Sep. 6, 1990

[51] Int. Cl.⁵ .............................................. B60B 7/06
[52] U.S. Cl. ................................. 301/37 S; 301/37 R
[58] Field of Search ................. 301/37 R, 37 T, 37 S, 301/37 C, 37 CD, 108 S, 108 R

[56] References Cited

U.S. PATENT DOCUMENTS

| | | | |
|---|---|---|---|
| 2,130,207 | 9/1938 | Van Halteren | 301/37 S |
| 2,386,224 | 10/1945 | Lyon | 301/37 R |
| 2,386,231 | 10/1945 | Lyon | 301/37 CD |
| 2,614,001 | 10/1952 | Rycroft | 301/37 S X |
| 2,722,822 | 11/1955 | Thomas | 301/37 S X |

FOREIGN PATENT DOCUMENTS

| | | | |
|---|---|---|---|
| 1008974 | 5/1952 | France | 301/37 R |
| 2216852 | 10/1989 | United Kingdom | 301/37 S |

*Primary Examiner*—Russell D. Stormer
*Attorney, Agent, or Firm*—Edmond T. Patnaude

[57] ABSTRACT

The present invention relates to decorative wheel liners for the rear wheels of trucks. An adjustable wheel cover is provided which will accommodate wheels having a variety of widths for a given diameter of a wheel. The invention has first and second liner members, which are generally cylindrical in shape and conform to the shape of the inner portion of the wheel covered by the liner, and slide one within the other in telescopic relationship. A locking mechanism is provided between the two liner members such that the liners may be locked together after they have been adjusted to the size of the wheel on which they are fitted.

8 Claims, 9 Drawing Sheets

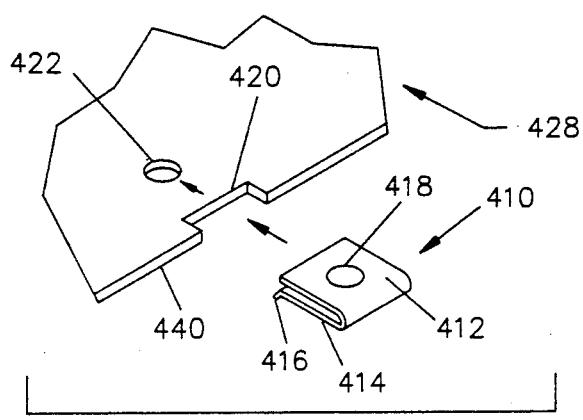
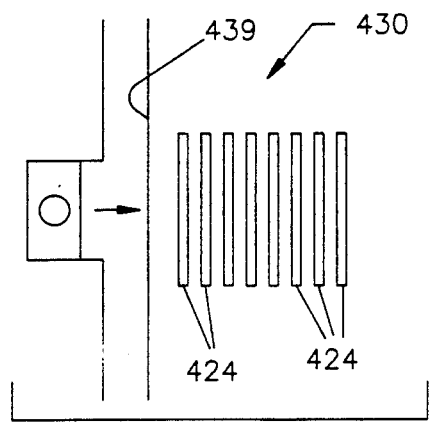
FIG.12   FIG.13
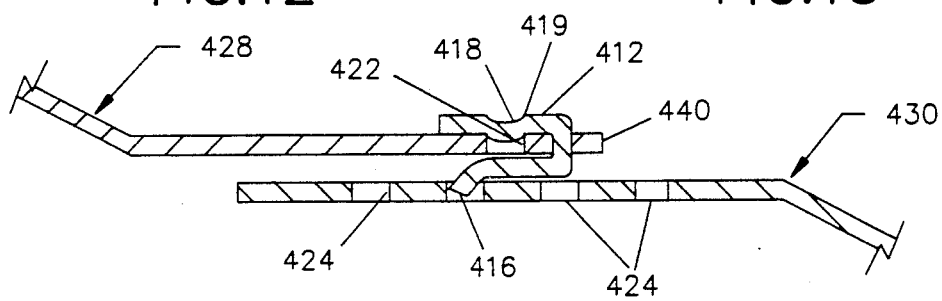
FIG.14
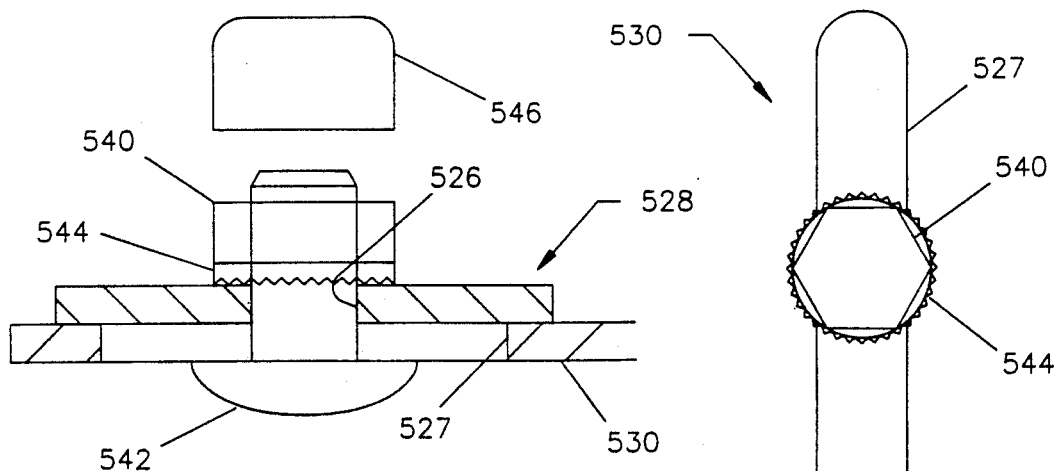
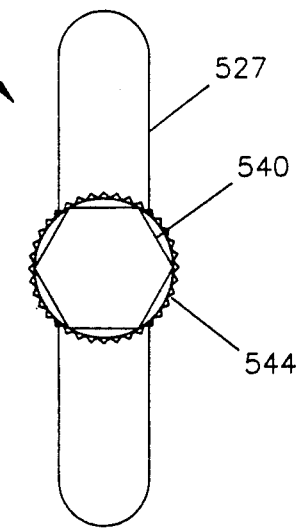
FIG.15   FIG.16

UNIVERSAL WHEEL LINER

The present invention relates to decorative wheel liners to be secured to the rear wheels of trucks and, specifically, to an adjustable wheel liner which can fit wheels of a given diameter but having a variety of widths.

BACKGROUND OF THE INVENTION

The rear wheels of trucks consist of a cylindrical section to which the tire is secured and a planar section transverse to one end of the cylindrical section. The planar section is adapted to be attached to the hub of the axle with the hollow cylindrical section extending outwardly therefrom with the inside of the cylindrical section of the wheel being visible from outside of the truck.

To enhance the exterior appearance of the rear wheels of trucks, wheel liners are provided which are held in place by the lug nuts which hold the wheels to the hub. These liners have a planar web section that rests against the planar section of the wheel, and a tubular section which extends across the width of the cylindrical section of the wheel to the outermost lip. For any given diameter of a wheel, different manufacturers may provide for a variety of different widths or thicknesses of the wheels, such that suppliers of wheel covers must maintain an expensive inventory which use substantial storage space. It is desirable to provide for an adjustable wheel cover which would fit a variety of widths of wheels for a given diameter and thereby reduce the cost and storage space needed for an inventory of wheel covers.

BRIEF DESCRIPTION OF THE INVENTION

The present invention provides for a first tubular liner member which has a planar web portion at one end adapted to be secured against the planar section of a truck wheel by the lug nuts which hold the wheel to the hub. The first liner member further has a tubular section, the axis of which is perpendicular to the planar section, which conforms to the shape of the inner surface of the cylindrical section of the wheel near the planar section of the wheel. In addition to the first liner member, a second tubular liner member is provided which is generally tubular in shape and conforms to the shape of the inner cylindrical surface of the wheel furthest from the planar section, and including the outer lip of the wheel. The first and second liner members are further designed to slide one within the other in telescopic relationship. Finally, a locking mechanism is provided on the two liner members, such that once the liners have been adjusted to the width of the wheel on which they are fitted, they can be locked together.

GENERAL DESCRIPTION OF THE DRAWINGS

The present invention will be better understood by a reading of the following detailed description taken in connection with the accompanying drawings wherein:

FIG. 12 is an enlarged fragmentary isometric view of the fifth embodiment of the locking mechanism.

FIG. 13 is an enlarged fragmentary plan view of the fifth embodiment of the locking mechanism.

FIG. 14 is an enlarged fragmentary longitudinal cross-sectional view of the fifth embodiment of the locking mechanism.

FIG. 15 is a fragmentary cross-sectional view of the sixth embodiment of the locking mechanism.

FIG. 16 is an enlarged fragmentary plan view of the sixth embodiment of the locking mechanism.

DETAILED DESCRIPTION OF THE INVENTION

Figure 1:
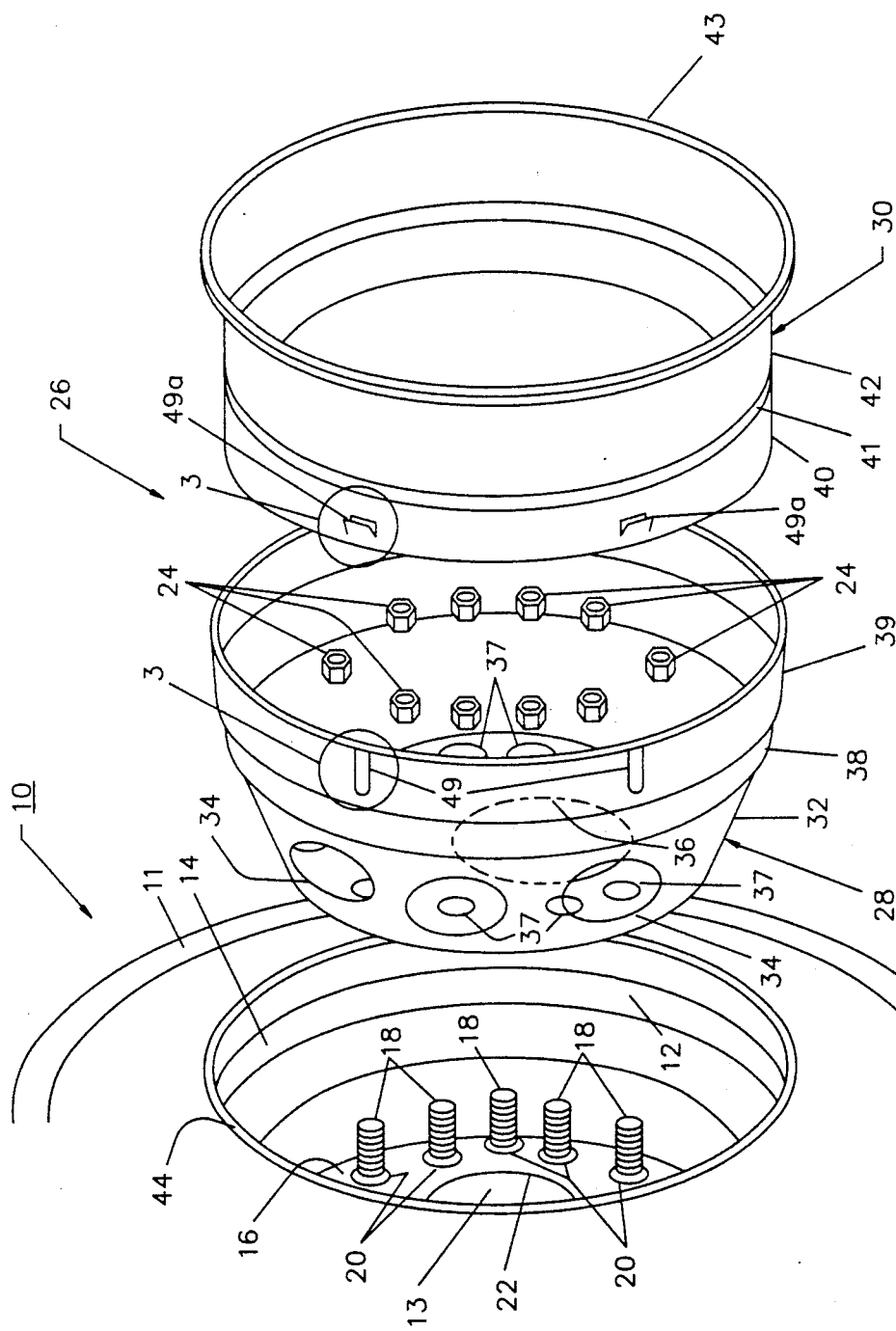
FIG. 1 is an exploded isometric view of the preferred embodiment of the invention.

As shown in FIG. 1 a typical rear wheel assembly 10 for a truck has an inflatable tire 11 which is mounted on a metal wheel 12. The wheel 12 is adapted to be attached to a hub 13 which is affixed to the axle of the truck near the outer end thereof. The wheel 12 has a tubular section 14 around which is fitted a tire 11, and transverse to the section 14 is a substantially planar web section 16. The hub 13 has a plurality of symmetrically spaced threaded studs 18 which project outwardly in parallel relationship with the axle. The planar section 16 has a plurality of symmetrically spaced openings 20, the locations of which correspond to the locations of threaded studs 18 mounted on the hub 13. The planar section 16 further has a centrally disposed circular aperture 22. To mount the wheel 12 on the hub 13, the openings 20 in the planar section 16 are slid over the threaded studs 18 on the hub 13. The wheel 12 is held in place against the hub by a plurality of lug nuts 24, one attached to each of the threaded studs 18

Figure 2:
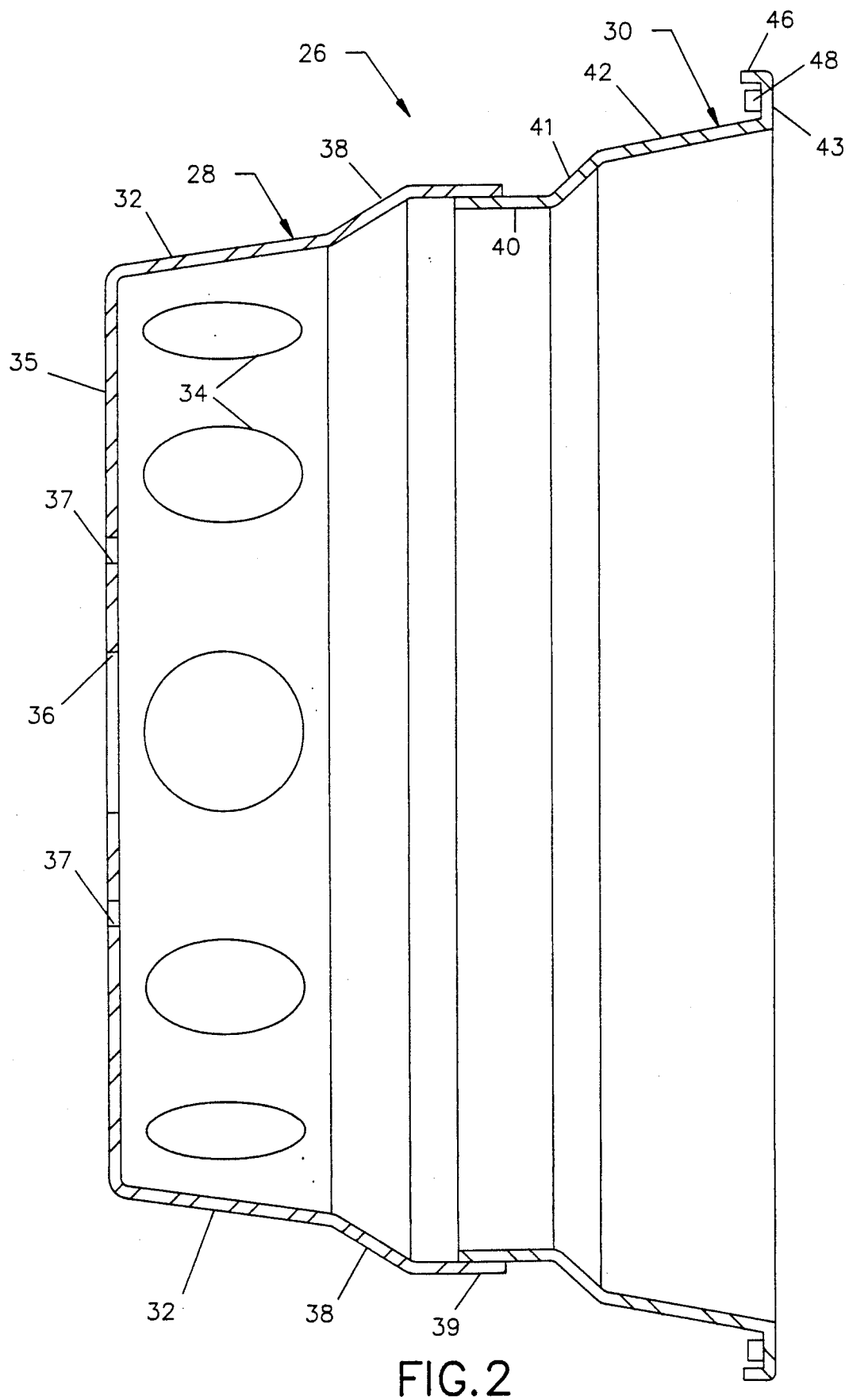
FIG. 2 is a cross-sectional view of the invention.

As can best be seen in FIG. 2, the present invention provides for an adjustable wheel liner 26 which has a first tubular inner liner member 28 and a second tubular outer liner member 30. The first liner member 28 has a first hollow frustoconical section 32, the shape of which is designed to conform generally to and t fit into the portion of the section 14 of the wheel 12 which is nearest the planar section 16. The first frustoconical section 32 is provided with a series of symmetrically spaced openings 34 around its circumference which enhance the aesthetic appearance of the wheel as viewed from the outside and provide access to serviceable portions of the wheel for inflating the tires 11 and the like.

The first wheel liner member 28 further has a planar web section 35 lying transverse to the longitudinal axis of the first frustoconical section 32. The web section 35 has a circular central aperture 36 surrounded by a concentric circle of symmetrically spaced smaller openings 37. The web section 35 is adapted to conform to the shape of the planar section 16 of the wheel 12. Similarly, the positions of the smaller openings 37 correspond to the positions of the threaded studs 18 on the hub 13. When openings 37 are the slid over the threaded studs 18, the web section 35 of the first liner member 28 will abut against the planar section 16 of the wheel 12. The lug nuts 24 which are used to secure the wheel 12 to the hub 13 are also used to secure the web section 35 of the first liner member 28 against the web section 16 of the wheel 12.

Adjacent the first frustoconical section 32, and opposite the web section 35 of the first liner member 28 is a second frustoconical section 38. Both the first and second frustoconical sections 32, 38 have shapes which conform to the portions of the inside contours of the cylindrical section 14 of the wheel 12 which these sections cover when the web section 35 is secured against the web section 16 of the wheel 12. Finally, adjacent the second frustoconical section 38, the first liner member 28 has a hollow cylindrical distal end section 39.

The second liner member 30 is generally tubular in shape, and has a hollow cylindrical section 40 with an exterior diameter a little smaller than the interior diameter of the distal end of cylindrical section 39 of the first liner member 28. Cylindrical section 40 of the second liner member 30 can therefore slide inside cylindrical section 39 of the first liner member 28 in telescopic relationship with it. Adjacent cylindrical section 40 of the second liner member 30 is a first frustoconical section 41, and adjacent the first frustoconical section 41 is a second frustoconical section 42. Both first and second frustoconical sections 41 and 42 have shapes which conform to the shape of the tubular section 16 of the wheel 12 which are covered by these sections respectively, that is, the outermost portions of the wheel 12. The outer end of the second liner member 30 has an external annular flange 43 which surrounds the distal end of the second frustoconical section 42 such that when the second liner member 30 is fitted into wheel 12, the flange 43 will cover the outer lip 44 of the wheel, as shown in FIG. 1. As shown in FIG. 2, the flange 43 may have at its outer edge an inwardly turned annular ridge 46, such that when the second liner member 30 is inserted into wheel 12, the flange 43 and the ridge 46 will completely conceal the outer lip 44 of the wheel 12. On the back side of flange 43 there is provided an annular shock-absorbing padding 48. When the second liner member 30 is inserted into wheel 12, the shock-absorbing padding is compressed against the outer lip 44 of the wheel 12 and minimizes any sound which might otherwise result from the movement of the second liner member 30 relative to the wheel 12.

As best shown in FIG. 1, in order to secure the first liner member 28 to the second liner member 30, the present invention provides for a number of adjustable locking mechanisms 49 spaced around the cylindrical end section 39 of the first liner member 28 adjacent to the end which engages the second liner member 30. A corresponding number of engaging mechanisms 49A are spaced around the cylindrical end section 40 of the second liner member 30, and the locations of the engaging mechanisms 49A correspond to the locations of the adjustable locking mechanisms 49 such that when the cylindrical sections of the two liner members are telescopically assembled, the engaging mechanisms 49A on one liner member will engage the adjustable locking mechanisms 49 of the other liner member.

Figure 3:
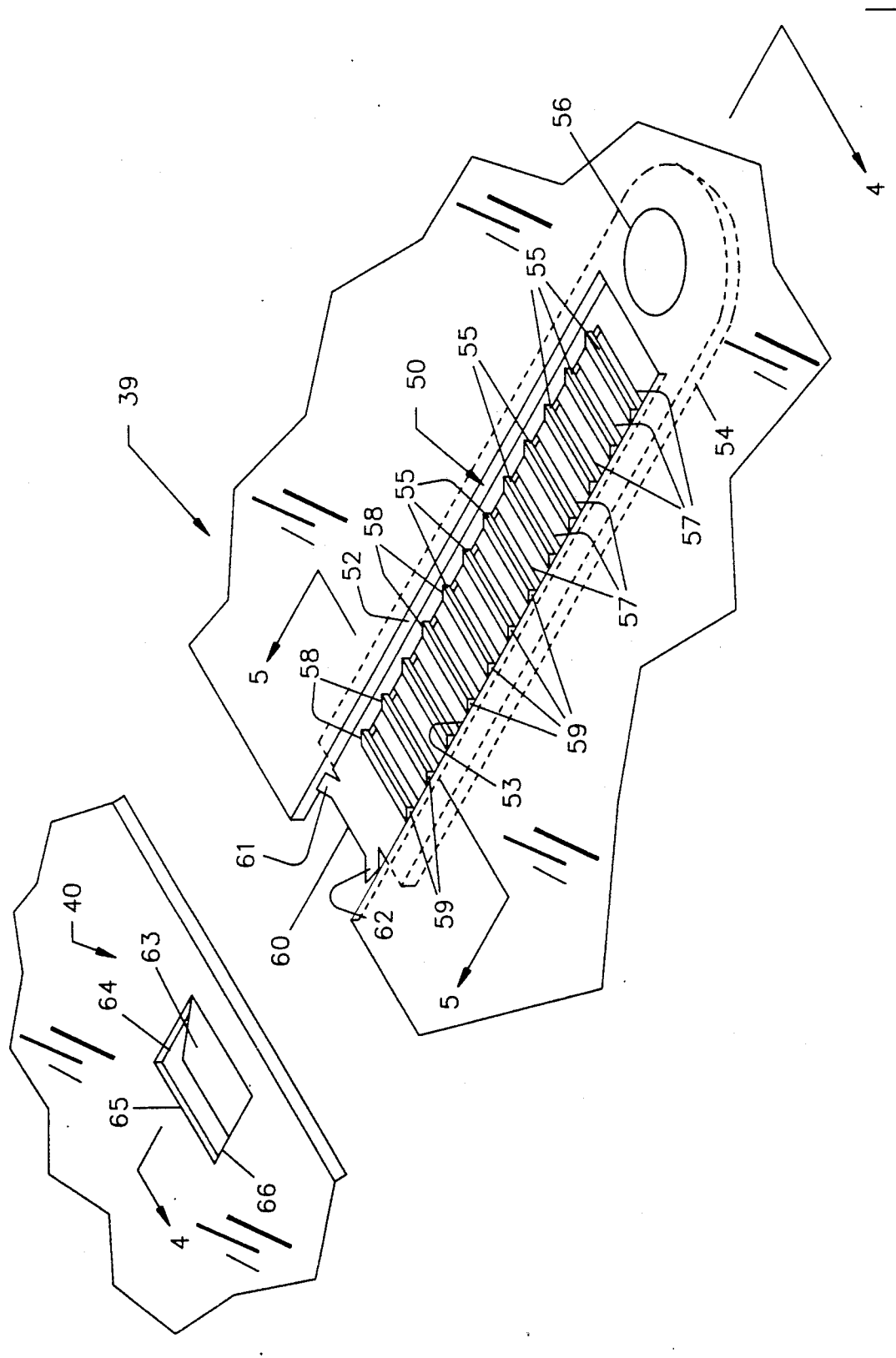
FIG. 3 is an enlarged fragmentary isometric view of the preferred embodiment of the locking mechanism.
Figure 4:
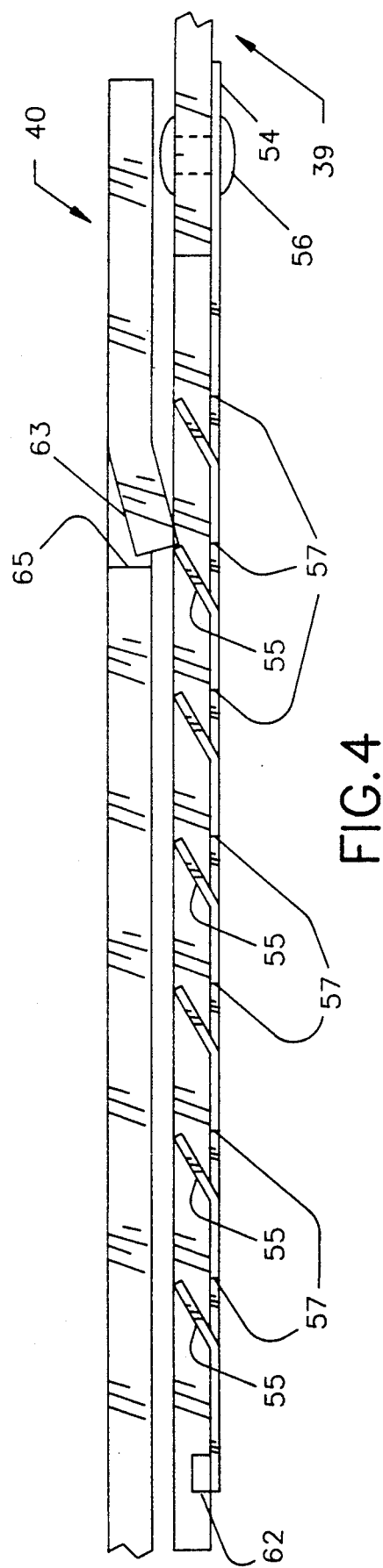
FIG. 4 is an enlarged fragmentary longitudinal cross-sectional view of the preferred embodiment of the locking mechanism.
Figure 5:
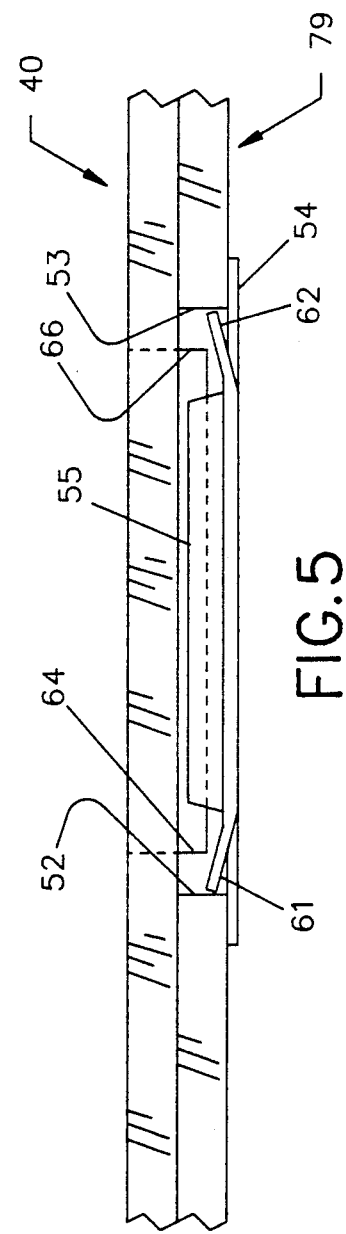
FIG. 5 is an enlarged fragmentary end cross-sectional view of the preferred embodiment of the locking mechanism.

As best shown in FIG. 3, the locking mechanism includes a plurality of longitudinal slots 50 cut in the distal end of the cylindrical section 39 of the first liner member 28, each of the slots 50 having side edges 52 and 53. A plate 54 having a plurality of inclined ramp-like resilient teeth 55 is attached by a bolt or rivet 56 to the outer surface of cylindrical section 39 near the inner end of each slot 50. As shown in FIG. 3, FIG. 4 and FIG. 5. The teeth 55 are rectangular in shape and are formed by a series of parallel transverse cuts 57 with longitudinal cuts 58, 59 starting at the two ends of the transverse cuts 57 and extending toward the distal end of cylindrical section 39. The teeth 55 are bent to project inwardly between the sides of slot 50, and away from the distal end of cylindrical section 39 of the first liner member 28. The plate 54 further has at the far end 60, opposite the rivet 56, a pair of inwardly bent resilient guides 61 and 62, which wedge against the side edges 52 and 53 of the slot 50 and hold the far end 60 of the plate 54 within the slot 50. The plate 54 and the cuts 57, 58, 59 in the plate 54 required to form the teeth 55 and the guides 61 and 62 are best made in a punching operation using a cutting die.

As shown in FIG. 3 and FIG. 4, to engage the teeth 55 the second liner member 30 has a plurality of tongues 63, one tongue corresponding in location to each plate of teeth 55 on the first liner member 28. As shown in these figures, the tongues 63 are formed by cutting three sides 64, 65, and 66 of a rectangle, leaving the fourth uncut side parallel to and adjacent to the inner edge of the cylindrical section 40 of the second liner member 30. The tongues 63 are bent outwardly towards the first liner member 28 and the teeth 55, and the width of the tongues 63 as determined by the length of cut 65, is less than the width of the teeth 55 as determined by the length of transverse cut 57.

After the first liner member 28 has been secured to the hub 13 and the wheel 12 by lug nuts 24, cylindrical section 40 of the second liner member 30 may be slid inside the distal end of cylindrical section 39 of the first liner member 28. When the two liner members are engaged with each other, one tongue 63 on the second liner member 30 will slide into each of the longitudinal slots 50 of the first liner member 28, and will slide over the resilient teeth 55 in the plate 50 until the shock-absorbing material 48 on the back side of the flange 43 is compressed against the outer edge 44 of the wheel 12. Thereafter, the engagement of the tongues 63 to the teeth 55 prevents the second liner member 30 from separating from the first liner member 28. Also, as can best be seen in FIG. 5, the side edges 64 and 66 of the tongue 63 will project between the sides 52 and 53 of slot 50 and prevent the axial rotation of the liner members relative to one another.

Figure 6:
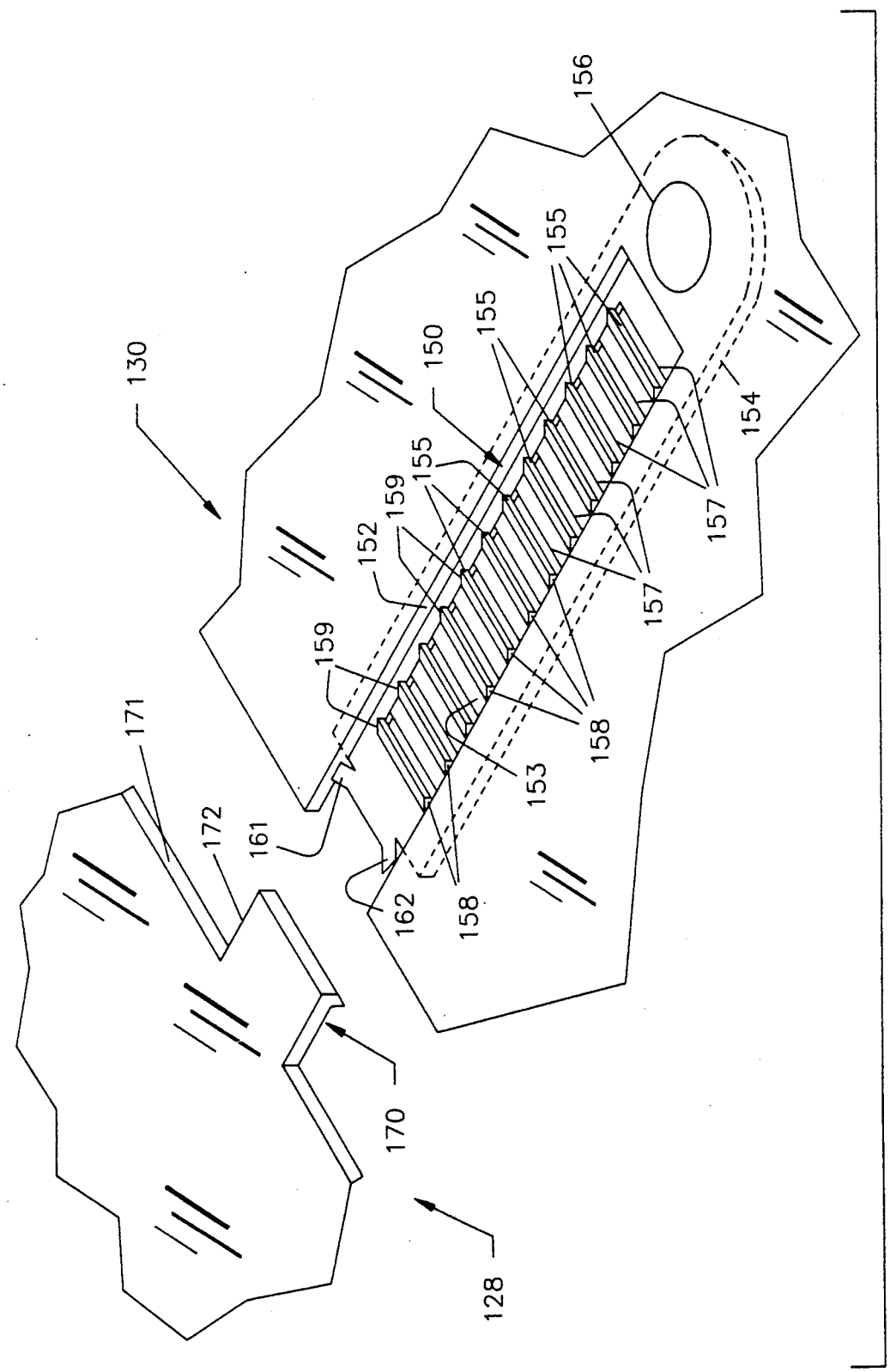
FIG. 6 is an enlarged fragmentary isometric view of the second embodiment of the locking mechanism
Figure 7:
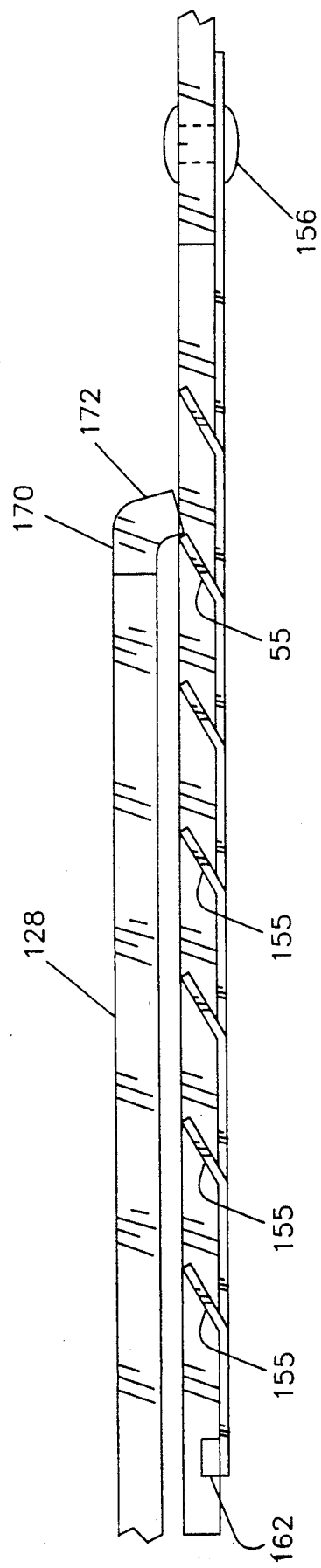
FIG. 7 is an enlarged fragmentary longitudinal cross-sectional view of the second embodiment of the locking mechanism.

A number of alternative fastening means may be used to lock the two liner members together. A second embodiment is shown in FIG. 6 and FIG. 7. FIG. 6 shows a locking mechanism on one liner member 128 positioned prior to engaging a plate 154 of inclined ramp-like teeth 155 on a second liner member 130. Referring to FIG. 6, plate 154 fits within a slot 150 having sides 152 and 153 and is held at one end by rivet 156, is positioned at the other end by guides 161 and 162, and has a series of equally spaced transversely cut teeth 155. The teeth 155 are formed from a series of parallel transverse cuts 157 in the plate 154 with longitudinal cuts 158 and 159 at the two ends as was the case in the first embodiment. The teeth project between the sides of slot 150 and away from the distal end of liner member 130, and toward the other liner member 128. Instead of providing a tongue to engage the teeth as in the first embodiment, the second embodiment provides for a hook 170, which extends from inner edge 171 of the liner member 128. The hook 170 consists of an extension 172 of the metal of the distal end of liner member 128, the end of which is bent outwardly so as to engage the teeth 155 of the plate 154 on liner member 130. When the liner members are assembled, as shown in FIG. 2, the hooks 170 slide along the plate of teeth 155 until the flange 43 on the second liner member 30 rests against the outer edge 43 of the wheel 12, at which time the hooks 170 lock into the sets of teeth 155.

Figure 8:
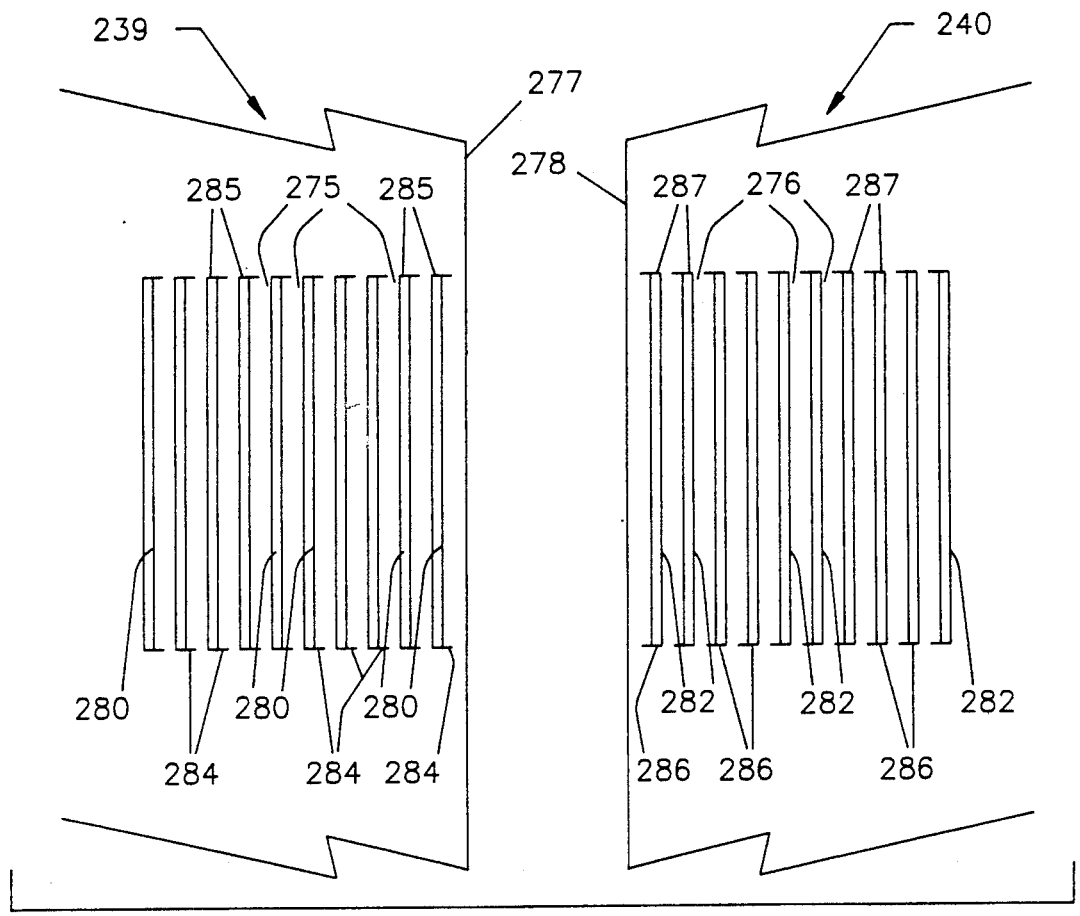
FIG. 8 is an enlarged fragmentary plan view of the third embodiment of the locking mechanism.
Figure 9:
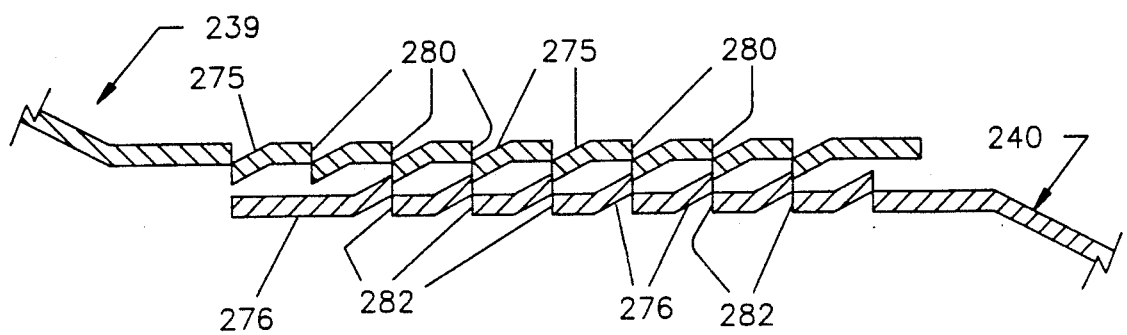
FIG. 9 is an enlarged fragmentary longitudinal cross-sectional view of the third embodiment of the locking mechanism.

A third embodiment of the locking mechanisms is shown in FIG. 8 and FIG. 9. As shown in FIG. 8, the separate plate can be eliminated, and a series of elongate, equally spaced, transversely oriented louvers 275 and 276 can be die cut directly into the hollow cylindrical sections 239 and 240 of the liner members adjacent to the respective ends 277 and 278 of each liner member. The louvers of each are of equal length and are formed by making a series of equally spaced parallel cuts 280, 282 in cylindrical sections 239 and 240 of the liner members. Beginning at the ends of cuts 280, 282 of each liner member, and extending toward the distal end of each liner member, are cross cuts 284, 285 and 286, 287, respectively, in each liner member, leaving three sided elongated louvers 275, 276 with the attached side of each louver being the side closest to inner edges 277 and 278 of the respective cylindrical sections 239, 240. As can be seen in FIG. 9, the louvers 275 on cylindrical section 239 are bent toward cylindrical section 240 and the louvers 276 on cylindrical section 240 are bent toward cylindrical section 239. When the cylindrical sections 239 and 240 of the liner members are fitted into each other, the louvers 275, 276 of each will engage each other, locking the two together.

Figure 10:
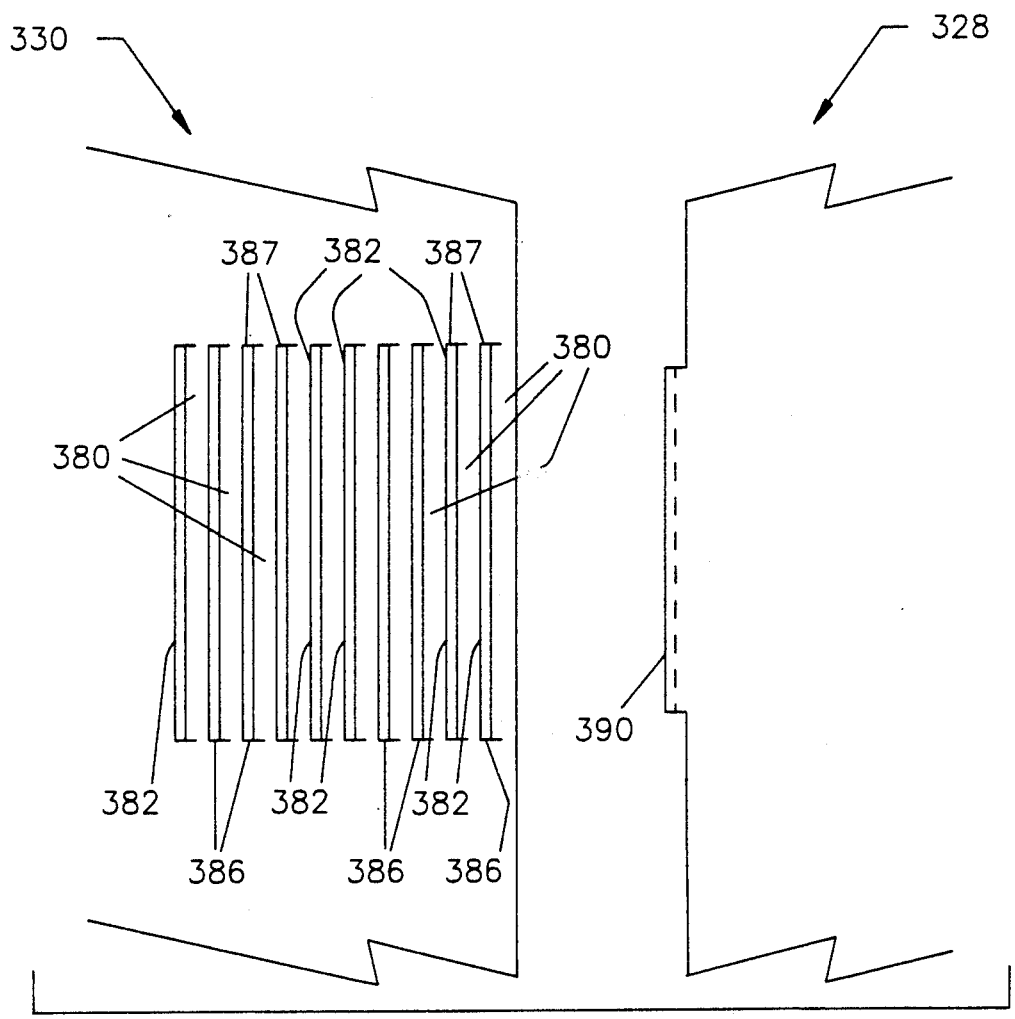
FIG. 10 is an enlarged fragmentary plan view of the fourth embodiment of the locking mechanism.
Figure 11:
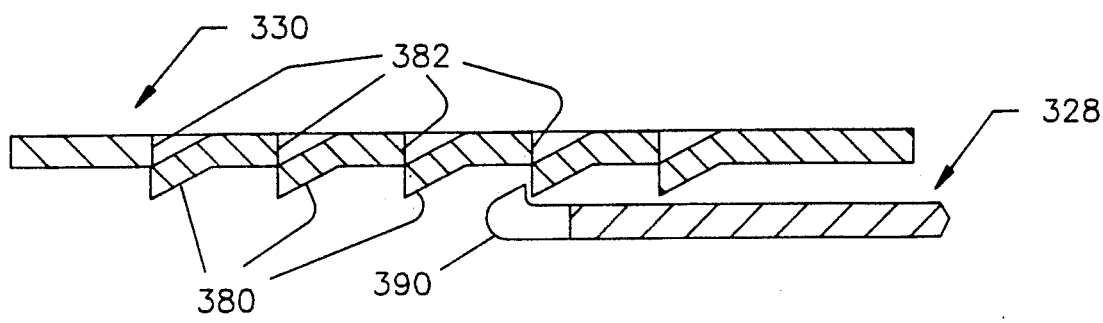
FIG. 11 is an enlarged fragmentary longitudinal cross-sectional view of the fourth embodiment of the locking mechanism.

A fourth embodiment of the locking mechanism is shown in FIG. 10 and FIG. 11. This embodiment uses the series of transversely oriented equally spaced elongate louvers as shown in the third embodiment on one of the liner members 330. The louvers 380 are adjacent the inner edge of liner member 328 and are formed by making a series of parallel elongated transverse cuts 382 therein with cross cuts 386 and 387 beginning at each end thereof and extending toward the distal end of liner member 330. The louvers 380 are attached on the uncut side nearest the inner edge 377, and are bent toward the other liner member 328 as in the third embodiment. To engage the louvers 380, a hook 390 is provided on the liner member 328. The hook 390 consists of an extension of the metal of the liner member 328 at the distal end thereof. The width of the hook 390 is a little less than the length of the transverse cuts 382, and is bent in a direction such that when the liner members are assembled, the hooks 390 lock into the louvers 380 of liner member 330.

A fifth embodiment of the locking mechanism is shown in FIG. 12, FIG. 13 and FIG. 14. As can best be seen in FIG. 12, this embodiment utilizes a U-shaped clip 410 having upper and lower plates 412 and 414 respectively as the legs of the U. The free end of lower plate 414 is bent outwardly to make a tooth 416. In the center of the upper plate 412 a depressed dimple 418 is stamped, which results in a button shaped protrusion 419 on the under surface of upper plate 412. A notch 420 is provided in the cylindrical distal end 440 of one of the liner members 428 which is wide enough to accommodate the width of the clip 410. A hole 422 is provided adjacent notch 420, into which the button 419 on the under side of upper plate 412 is snapped when each of the upper and lower plates 412, 414 are slid on opposite sides of the distal end 440.

As can be seen in FIG. 13, the cylindrical section of the other liner member 430 has corresponding to the position of each clip on liner 428, a series of equally spaced, longitudinally oriented sets of transverse slots or embossments 424 adjacent the inner edge 439 thereof. Slots or embossments 424 are longer than the width of the tooth 416 and wider than the width of the clip 410, and tooth 416 is oriented on the clip 410 such that it will fall into slots or embossments 424 when the two liner members are assembled.

A sixth embodiment of the lock is shown in FIG. 15 and FIG. 16. In this embodiment, a series of holes 526 are spaced around the cylindrical section one liner member 528 and a series of longitudinally oriented slots 527 are provided around the cylindrical section in the other liner member 530 at positions corresponding to the positions of the holes 526 on the first liner 528. When the holes 526 are aligned over slots 527, the two liner members are joined together by a nut 540 and a bolt 542, and locked into position by a lock washer 544. The end of the bolt 542 and the nut 544 may be covered by a protective cap 546.

While the present invention has been described in connection with six embodiments, it will be understood by those skilled in the art that many changes and modifications may be made without departing from the true spirit and scope of the present invention. Therefore, it is intended by the appended claims to cover all such changes and modifications which come within the true spirit and scope of this invention.

I claim:

1. An adjustable wheel liner for covering a truck wheel of the type having a generally planar hub section adapted to be mounted by means of a plurality of bolts to the axle of a truck and a generally tubular section extending outwardly from said hub section and over which a tire is adapted to be mounted, comprising in combination:

a first liner member having a transverse wall at one end thereof provided with a plurality of openings for receiving said plurality of bolts when said transverse wall is positioned against said hub section, and a tubular section integral with said transverse section and substantially conforming with the shape of the portion of said tubular section of said wheel lying adjacent to said hub section, a second liner member of tubular configuration telescopically engaging the distal end portion of said tubular section of said first liner member, said second liner member being axially adjustable over said first liner member and conforming with the shape of the outer portion of said tubular section of said wheel, and locking means connected between said first and second liner members for fixedly securing said liner members together.

2. An adjustable wheel liner for covering a truck wheel as set forth in claim 1 wherein said locking means comprises:

a plurality of longitudinally oriented slots spaced around the end of the tubular section of one of said liner members, a plurality of plates, each of said plates having a plurality of teeth therein, said plates secured to the liner member having said slots therein such that the teeth of each of said plates project between the sides of said slots toward the other of said liner members, and a plurality of tongues on the other of said liner members, said tongues being spaced around the tubular end of the other of said liner members with positions corresponding to the positions of said slots, said tongues projecting away from the edge of the liner member to which they are attached and toward said teeth so as to engage said teeth when said second liner member is engaged with said first liner member.

3. An adjustable wheel liner for covering a truck wheel as set forth in claim 1 wherein said locking means comprises:

a plurality of longitudinally oriented slots spaced around the end of the tubular section of one of said liner members, a plurality of plates, each plate having a plurality of teeth cut therein, said plates being secured to the liner member having said slots therein, said teeth projecting between the sides of said slot and projecting toward the other of said liner members and projecting away from the end of said liner member to which the plate is secured, and a plurality of hooks at the ends of the tubular section of the other of said liner members, the positions of said hooks corresponding to the positions of said plates of teeth, said hooks being bent so as to engage said teeth when said second liner member is engaged with said first liner member.

4. An adjustable wheel liner for covering a truck wheel as in claim 1 wherein said locking means comprises:

a plurality of sets of transverse louvers spaced around the tubular sections of both of said liner members, each of the sets of louvers being adjacent the edge of the liner member which engages said other liner member and longitudinally oriented on said tubular members, the locations of said louvers on said first liner member corresponding to the location of the louvers on said second liner member, the louvers of each liner member projecting away from the adjacent end of such liner member to which it is a part and toward the louvers of the other liner member such that the louvers of each liner member will engage the louvers of the other liner member when said second liner member is disposed over said first liner member.

5. An adjustable wheel liner for covering a truck wheel as in claim 1 wherein said locking means comprises:

a plurality of sets of transvers louvers spaced around the tubular section of one of said liner members, each of said sets of louvers being longitudinally oriented on said tubular section and adjacent the edge of said tubular section, said, louvers projecting away from the adjacent edge of the tubular section of which it is a part and toward the other of said liner members, and a plurality of hooks at the ends of the tubular section of the other of said liner members, the position of said hooks on said other liner member corresponding to the position of said louvers on said one of said liner members, said hooks being bent so as to engage said louvers when said second liner member is disposed over said first liner member.

6. An adjustable wheel liner for covering a truck wheel as in claim 1 wherein said locking means comprises:

a plurality of longitudinally oriented series of embossments spaced around the end of the tubular section of one of said liner members, a plurality of U-shaped clips spaced around and attached to the end of the tubular section of the other of said liner members, the position of the clips around said one of said liner members corresponding to the position of said series of embossements on said other liner members, and, a tooth on each of said U-shaped clips oriented so as to drop into one of said embossments in said series of embossments when said second liner member is engaged with said first liner member 7. An adjustable wheel liner for covering a truck wheel as in claim 1 wherein said locking means includes, a plurality of bolts passing through a series of holes spaced around the end of the tubular section of one of said liner members, a plurality of longitudinally oriented slots spaced around and adjacent the end of the other of said liner members, the positions of said slots corresponding to the positions of said bolts passing through said holes on said one of said liner members, and a plurality of nuts, one for each of said bolts to be secured to each of said bolts after each of said bolts is passed through one of said holes and one of said slots.

8. The method of securing a decorative wheel covering to a truck wheel having a cylindrical section and a transverse planar section which is secured to a hub by a plurality of bolts projecting from said hub and passing through the planar section of said wheel, comprising:

securing a first liner member having a tubular section and a transverse web at one end of said tubular section to the planar section of said wheel by passing said bolts projecting from said hub through corresponding holes in said web and tightening nuts on the ends of said bolts, telescopically fitting one end of a second tubular liner member over the distal end of said tubular section of said first liner member, and, locking said first liner member to said second liner member.

* * * * *